Figure 1:
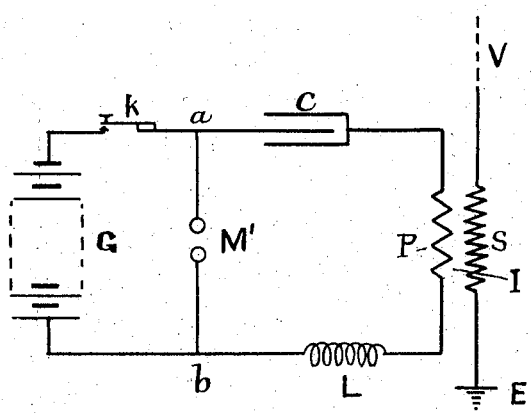

No. 767,983. PATENTED AUG. 16, 1904.
J. S. STONE.
SPACE TELEGRAPHY.
APPLICATION FILED NOV. 25, 1903.
NO MODEL.

WITNESSES
Brainerd J. Judkins
Eleanor B. Tomlinson.

INVENTOR
John Stone Stone.

No. 767,983. Patented August 16, 1904.

UNITED STATES PATENT OFFICE.

JOHN STONE STONE, OF CAMBRIDGE, MASSACHUSETTS, ASSIGNOR TO WILLIAM W. SWAN, TRUSTEE, OF BROOKLINE, MASSACHUSETTS.

SPACE TELEGRAPHY.

SPECIFICATION forming part of Letters Patent No. 767,983, dated August 16, 1904.

Application filed November 25, 1903. Serial No. 182,630. (No model.)

*To all whom it may concern:*

Be it known that I, JOHN STONE STONE, a citizen of the United States, and a resident of Cambridge, in the county of Middlesex and State of Massachusetts, have invented a certain new and useful Improvement in Space Telegraphy, of which the following is a specification.

My invention relates to the art of wireless or space telegraphy, and more particularly to that form of space telegraphy in which electromagnetic waves are developed by producing electrical vibrations or oscillations in an elevated conductor, preferably vertically elevated.

Heretofore electromagnetic waves have been produced by charging a condenser by a source of rapidly-varying currents—as, for example, a Ruhmkorff coil or an alternating-current generator—and allowing the condenser to discharge across the spark-gap, thereby setting up electrical vibrations in the circuit of said condenser and spark-gap, which are conveyed to an elevated conductor. An example of such system is found in my Letters Patent No. 714,756, December 2, 1902. In such systems the frequency of the currents in the primary of the Ruhmkorff coil or the frequency of the currents produced by the alternating-current generator is usually low and well within the frequency of audibility in acoustic waves. In the systems most commonly employed to-day the spark-gap is itself included in the elevated conductor and is sometimes shunted by a condenser. In such systems under the most favorable conditions the number of electrical oscillations set up by a single prime discharge across the spark-gap rarely exceeds five or ten before the condition of electrical equilibrium is restored, and consequently there is a comparatively long period during which no electromagnetic waves are radiated. For example, if the condenser is charged and discharged one thousand times per second and if the frequency of the electrical oscillations set up in the elevated conductor is one million periods per second there will be an interval of time equal to one one-thousandth second after each prime condenser-discharge. If such discharge or prime spark produce as many as twenty electrical oscillations before the condition of electrical equilibrium of the system be restored, the trains of oscillations will have a duration of one fifty-thousandth second, and there will be an interval of one one-thousandth second minus one fifty-thousandth second, during which no electric vibrations will be developed in the elevated conductor and during which, consequently, no electromagnetic waves will be radiated.

By means of the system described in my hereinbefore-mentioned Letters Patent each discharge of the condenser in the sonorous or persistently-oscillating circuit will produce a great number of electrical vibrations or oscillations in said circuit before the amplitude of the oscillations falls to $\frac{1}{e}$th of its initial value.

Even with this great persistency of electrical oscillation it will be seen that unless the rate of variation of the current in the primary circuit is very high there will be, as above set forth, intervals of time during which no electromagnetic waves are developed.

The object of this invention is the realization of a system in which a practically continuous train of electromagnetic waves of substantially constant amplitude is developed by producing a practically continuous train of electric vibrations of substantially constant amplitude in an elevated conductor as distinguished from those systems in which electromagnetic waves are transmitted in groups or trains separated by intervals of time during which no waves are radiated.

In Letters Patent No. 638,152, granted November 28, 1899, upon an application filed by me December 15, 1896, in the art of wire telephony I have described a method of producing continuous electrical oscillations of uniform or substantially uniform amplitude in a sonorous circuit and of impressing corresponding oscillations in a main line or signaling circuit, the object of that invention being to realize telephonic transmission over such signaling-circuit by variation of the amplitude of an oscillatory current of inaudibly high frequency traversing the circuit, such variation corresponding to the sound vibrations of the speech to be transmitted.

I find that in the art of wireless telegraphy great advantages accrue by impressing a continuous oscillatory force upon the elevated conductor in contradistinction to periodically impressing such oscillatory force upon said elevated conductor in the manner hereinbefore briefly set forth. The apparatus and method of its operation may best be understood by having reference to the drawings which accompany and form a part of this specification.

Figure 2:
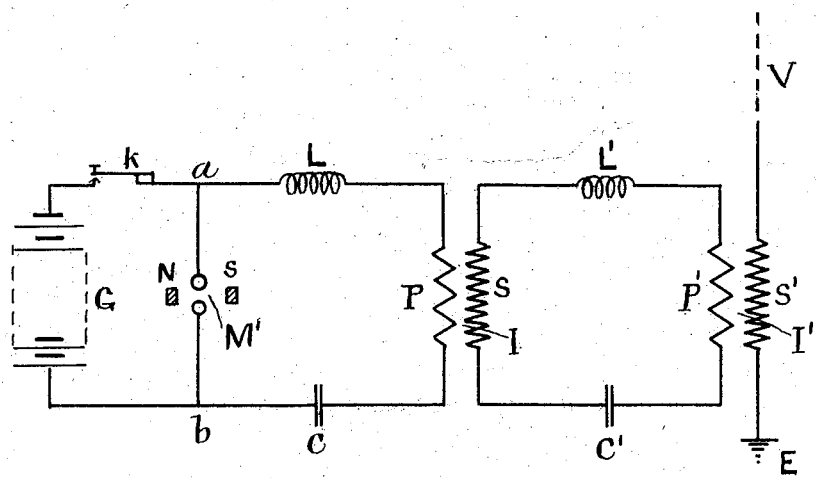

Figure 1 represents a means of continuously impressing periodic electromotive forces upon the elevated-conductor system V S E. Fig. 2 represents a means of continuously impressing simple harmonic electromotive forces upon the elevated-conductor system V S E.

In the figures, V is an elevated conductor. $k$ is a key. I I' are transformers whose windings are respectively P S and P' S'. C C' are condensers. M' is a spark-gap. G' is a direct-current generator.

The circuit $a$ G $b$ is a circuit of large electromotive force and high resistance.

The circuit C P L M' is a sonorous circuit, and in Fig. 2 the circuit C' P' L' S is a resonant weeding-out circuit, the general function of which was first set forth by Dr. Louis Duncan in a paper published in the *Transactions of the American Institute of Electrical Engineers*, Vol. IX, June 6, 1892, and its application to wireless telegraphy has been fully explained by me in my Letters Patent No. 714,756.

In the operation of the organization shown in Fig. 1 the generator G charges the condenser C till the potential difference at the spark-gap M' is sufficient to overcome the dielectric strength of the intervening medium, when a disruptive discharge takes place at that point. When such a disruptive discharge takes place, the resistance at that point becomes abruptly and enormously diminished. Owing to the resistance of the generator G, or, more generally speaking, to the impedance of the circuit M' $a$ G $b$, the potential difference at M' immediately becomes quite insignificant. By virtue of the electromagnetic inertia of the circuit M' $a$ C P L $b$ the condenser C overdischarges till it receives a charge in the opposite direction almost equal to the initial charge. The spark then ceases to pass across the space at M' and the generator G proceeds to charge C in the initial direction till the potential difference at M' is again sufficient to produce a disruptive discharge at M', when the above-mentioned cycle is repeated. The continuous train of electric oscillations so produced is impressed upon the elevated-conductor system V S E, and if the frequency of said oscillations be so adjusted that it corresponds to the frequency of the fundamental of said elevated-conductor system a maximum amplitude of electrical oscillations will result in the vertical system and the amplitude of said oscillations will be far greater than if a train of a limited number of electric oscillations be so impressed upon the elevated-conductor system. The amplitude of the electromagnetic waves radiated from said elevated conductor is therefore correspondingly greater and uniform.

In the system shown in Fig. 2 the resonant circuit C' P' L' S is attuned to the frequency of the electric oscillations developed by the sonorous circuit C P L M', and therefore renders the oscillatory electromotive forces impressed upon the vertical conductor simple harmonic in form. The function of the permanent magnet $n\ s$ is the usual function of such magnet in connection with a spark-gap—*i. e.*, of extinguishing the spark.

I claim—

1. In a system of space telegraphy, an elevated conductor and means associated therewith for developing a continuous train of electrical oscillations therein.

2. In a system of space telegraphy, an elevated conductor, means associated therewith for developing a continuous train of electrical oscillations, and means for impressing said continuous train of electrical oscillations upon said elevated conductor.

3. In a system of space telegraphy, an elevated conductor and means for impressing thereon a continuous train of electrical oscillations of substantially constant amplitude.

4. In a system of space telegraphy, an elevated conductor and means associated therewith for developing therein a continuous train of electrical oscillations of substantially constant amplitude.

5. In a system of space telegraphy, a sonorous circuit containing a condenser, a source of direct current for charging said condenser, and an elevated conductor associated with said sonorous circuit.

6. In a system of space telegraphy, a sonorous circuit containing a condenser, a source of direct current for charging said condenser, a resonant circuit attuned to the frequency of the electrical oscillations developed by said sonorous circuit, and an elevated conductor associated with said resonant circuit.

7. In a system of space telegraphy, an elevated conductor and means for impressing thereon a continuous train of electrical oscillations.

8. In a system for developing a substantially continuous train of electromagnetic waves of substantially constant amplitude, an elevated conductor and means for developing therein a substantially continuous train of electrical oscillations of substantially constant amplitude.

9. In a system for developing a substantially continuous train of simple harmonic electromagnetic waves of substantially constant amplitude, an elevated conductor and means for developing therein a substantially continuous train of simple harmonic electrical oscillations of substantially constant amplitude.

10. In a system of space telegraphy, an elevated conductor and a continuously-oscillating circuit associated therewith.

11. In a system of space telegraphy, an elevated conductor and a continuously-oscillating circuit inductively associated therewith.

12. In a system of space telegraphy, an elevated conductor and a continuously-oscillating circuit inductively associated therewith by means of a step-up transformer.

13. In a system of space telegraphy, an elevated conductor system having a definite fundamental frequency associated with a continuously-oscillating circuit adapted to develop electrical oscillations of said frequency.

14. In a system of space telegraphy, an elevated conductor system having a definite fundamental frequency inductively associated with a continuously-oscillating circuit adapted to develop electrical oscillations of said frequency.

15. In a system of space telegraphy, an elevated conductor system having a definite fundamental frequency inductively associated by means of a step-up transformer with a continuously-oscillating circuit adapted to develop electrical oscillations of said frequency.

16. In a system of space telegraphy, an elevated conductor, a continuously-oscillating circuit, and a resonant circuit, attuned to the frequency of the oscillations developed by said continuously-oscillating circuit, interposed between said continuously-oscillating circuit and the elevated conductor.

17. In a system of space telegraphy, an elevated conductor, a continuously-oscillating circuit, and a resonant circuit, attuned to the frequency of the oscillations developed by said continuously-oscillating circuit, interposed between said continuously-oscillating circuit and the elevated conductor and inductively associated with said elevated conductor.

18. In a system of space telegraphy, an elevated conductor, a continuously-oscillating circuit, and a resonant circuit, attuned to the frequency of the oscillations developed by said continuously-oscillating circuit, interposed between said continuously-oscillating circuit and the elevated conductor and inductively associated with said elevated conductor by means of a step-up transformer.

19. In a system of space telegraphy, an elevated-conductor system having a definite fundamental frequency, a continuously-oscillating circuit adapted to develop electrical oscillations of said frequency, and a resonant circuit, attuned to the said frequency and interposed between said continuously-oscillating circuit and the elevated-conductor system.

20. In a system of space telegraphy, an elevated-conductor system having a definite fundamental frequency, a continuously-oscillating circuit adapted to develop electrical oscillations of said frequency and a resonant circuit, attuned to the said frequency and interposed between said continuously-oscillating circuit and the elevated-conductor system and inductively associated with said elevated-conductor system.

21. In a system of space telegraphy, an elevated-conductor system having a definite fundamental frequency, a continuously-oscillating circuit adapted to develop electrical oscillations of said frequency and a resonant circuit, attuned to the said frequency and interposed between said continuously-oscillating circuit and the elevated-conductor system and inductively associated with said elevated-conductor system by means of a step-up transformer.

22. In a system of space telegraphy, an elevated-conductor system having a definite fundamental frequency, and means for developing therein a continuous train of electrical oscillations of corresponding frequency and of substantially constant amplitude.

23. In a system of space telegraphy, a sonorous circuit containing a condenser, a source of direct current for charging said condenser, and an elevated-conductor system associated with said sonorous circuit, the period of the sonorous circuit corresponding to the fundamental period of the elevated-conductor system.

24. In a system of space telegraphy, a sonorous circuit containing a condenser, a source of direct current for charging said condenser, a resonant circuit attuned to the frequency of the electrical oscillations developed by the said sonorous circuit and an elevated-conductor system associated with said resonant circuit and attuned as to its fundamental to the said frequency.

25. In a system of space telegraphy, a sonorous circuit containing a condenser, a source of direct current for charging said condenser, a resonant circuit attuned to the frequency of the electrical oscillations developed by the said sonorous circuit and an elevated-conductor system associated with said resonant circuit by means of a step-up transformer and attuned as to its fundamental to the said frequency.

In testimony whereof I have hereunto subscribed my name this 24th day of November, 1903.

JOHN STONE STONE.

Witnesses:
  G. A. HIGGINS,
  BRAINERD T. JUDKINS.